(12) United States Patent
Sato

(10) Patent No.: US 12,459,130 B2
(45) Date of Patent: Nov. 4, 2025

(54) ROBOT OPERATION SYSTEM, ROBOT OPERATION METHOD, AND PROGRAM

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 18/467,296

(22) Filed: Sep. 14, 2023

(65) Prior Publication Data

US 2024/0131717 A1 Apr. 25, 2024
US 2024/0227195 A9 Jul. 11, 2024

(30) Foreign Application Priority Data

Oct. 19, 2022 (JP) ................................. 2022-167574

(51) Int. Cl.
*B25J 9/16* (2006.01)
(52) U.S. Cl.
CPC .................... *B25J 9/1697* (2013.01)
(58) Field of Classification Search
None
See application file for complete search history.

(56) References Cited

U.S. PATENT DOCUMENTS

| | | |
|---|---|---|
| 2018/0276500 A1 | 9/2018 | Yamada et al. |
| 2019/0299405 A1 | 10/2019 | Warashina et al. |
| 2020/0151488 A1 | 5/2020 | Suzuki et al. |
| 2021/0042576 A1 | 2/2021 | Namiki |
| 2021/0170579 A1 | 6/2021 | Toriihara et al. |
| 2023/0281967 A1 | 9/2023 | Watanabe |
| 2023/0405850 A1* | 12/2023 | Wada ..................... B25J 9/1656 |

FOREIGN PATENT DOCUMENTS

| | | | |
|---|---|---|---|
| JP | 2006003263 A | * | 1/2006 |
| JP | 2007048306 A | * | 2/2007 |
| JP | 2018-163554 A | | 10/2018 |
| JP | 2019028775 A | * | 2/2019 |

(Continued)

OTHER PUBLICATIONS

English translation of JP-2007048306-A (wherein the paragraph numbering provided coincides with any relevant citations to this reference within the accompanying Office Action) (Year: 2007).*

(Continued)

*Primary Examiner* — Jason Holloway
*Assistant Examiner* — Bryant Tang
(74) *Attorney, Agent, or Firm* — Oliff PLC

(57) ABSTRACT

A robot operation system with improved accuracy of a learning model accuracy is provided. Provided is a robot operation system including a composite image generation unit to which CAD data of an object and a workpiece and a feature point of the workpiece are input configured to generate a plurality of composite images under random conditions from the CAD data of the object and the workpiece, an information processing apparatus configured to search for a route using a position of an end effector of a robot and a position of the feature point and move the end effector to the feature point along the searched route, and an imaging apparatus configured to photograph the object and the workpiece.

6 Claims, 5 Drawing Sheets

(56) References Cited

FOREIGN PATENT DOCUMENTS

| | | | |
|---|---|---|---|
| JP | 2019089172 A | * | 6/2019 |
| JP | 2019-171540 A | | 10/2019 |
| JP | 2020-80023 A | | 5/2020 |
| JP | 2021-026599 A | | 2/2021 |
| JP | 2021-091022 A | | 6/2021 |
| WO | 2022/024165 A1 | | 2/2022 |

OTHER PUBLICATIONS

English translation of JP-2019089172-A (wherein the paragraph numbering provided coincides with any relevant citations to this reference within the accompanying Office Action) (Year: 2019).*
English translation of JP-2006003263-A (wherein the paragraph numbering provided coincides with any relevant citations to this reference within the accompanying Office Action) (Year: 2006).*
English translation of JP-2019028775-A (wherein the paragraph numbering provided coincides with any relevant citations to this reference within the accompanying Office Action) (Year: 2019).*
Oba, Takeru; "Image synthesis using semi-supervised learning for instance segmentation"; IPSJ SIG Technical Report; CVIM: Computer Vision and Image Media; 2019-CVIM-217 [online]; Information Processing Society of Japan; May 23, 2019; pp. 1-8.
English Translation of Apr. 22, 2025 Office Action issued in Japanese Patent Application No. 2022-167574.

* cited by examiner

ROBOT OPERATION SYSTEM, ROBOT OPERATION METHOD, AND PROGRAM

CROSS REFERENCE TO RELATED APPLICATIONS

This application is based upon and claims the benefit of priority from Japanese patent application No. 2022-167574, filed on Oct. 19, 2022, the disclosure of which is incorporated herein in its entirety by reference.

BACKGROUND

The present disclosure relates to a robot operation system, a robot operation method, and a program.

Japanese Unexamined Patent Application Publication No. 2021-26599 discloses an image processing system. The image processing system detects a picture of an object from an image photographed of the object. The image processing system includes a first detection apparatus that detects a picture of an object from the photographed image based on a model pattern showing a feature of the picture of the object. The image processing system also includes a learning apparatus that trains a learning model using the image used for detection by the first detection apparatus as input data and a result of the detection by the first detection apparatus as teacher data. The image processing system further includes a second detection apparatus that detects the picture of the object from the image based on the learning model trained by the learning apparatus.

SUMMARY

In the technique of Japanese Unexamined Patent Application Publication No. 2021-26599, training is performed using a model of a workpiece and a workpiece is detected from an image. However, since lighting conditions, a mounting position of the workpiece, photographing conditions, and so on of a real image change, the training using model data may not achieve the accuracy desired for the learning model. Therefore, an object of the present disclosure is to improve accuracy of a learning model by having an information processing apparatus generate and learn a plurality of composite images of an object, a workpiece, and a feature point from CAD (Computer-Aided Design) data.

A robot operation system according to the present disclosure includes:
  a composite image generation unit to which CAD data of an object and a workpiece and a feature point of the workpiece are input configured to generate a plurality of composite images under random conditions from the CAD data of the object and the workpiece;
  an information processing apparatus configured to search for a route using a position of an end effector of a robot and a position of the feature point and move the end effector to the feature point along the searched route; and
  an imaging apparatus configured to photograph the object and the workpiece.

The information processing apparatus includes:
  a memory unit configured to store a trained machine learner trained using a plurality of input training datasets, each of the training datasets being composed of a combination of the composite image and the position of the feature point; and
  an arithmetic unit configured to output the position of the feature point in response to an input of a photographed image of the workpiece to the trained machine learner read from the memory unit.

With the above configuration, it is possible to improve accuracy of a learning model by having an information processing apparatus generate and learn a plurality of composite images of an object, a workpiece, and a feature point from CAD data. Therefore, it is possible to provide a system that extracts the feature point of the workpiece and operate a robot in a teachless manner.

The robot operation system according to the present disclosure is characterized in that the random conditions are various angles and arrangements of the object and the workpiece, various distances to the object and the workpiece, various exposure conditions, and various backgrounds.

With the above configuration, the accuracy of extracting the feature point of the workpiece can be improved.

The robot operation system according to the present disclosure is characterized in that the plurality of composite images generated have varying sizes and aspect ratios.

With the above configuration, the accuracy of recognizing the workpiece can be improved.

The robot operation system according to the present disclosure is characterized in that the feature point is a grasping point or a welding point.

With the above configuration, the robot can grasp or weld the workpiece.

A robot operation method according to the present disclosure includes:
  inputting CAD data of an object and a workpiece and a feature point of the workpiece;
  generating a plurality of composite images under random conditions from the CAD data of the object and the workpiece;
  creating a trained machine learner trained using a plurality of input training datasets, each of the training datasets being composed of a combination of the composite image and a position of the feature point;
  photographing the object and the workpiece;
  outputting the position of the feature point in response to an input of a photographed image of the workpiece to the trained machine learner; and
  searching for a route using a position of an end effector of a robot and the position of the feature point and moving the end effector to the feature point along the searched route.

With the above configuration, it is possible to improve accuracy of a learning model by having an information processing apparatus generate and learn a plurality of composite images of an object, a workpiece, and a feature point from CAD (Computer-Aided Design) data. Therefore, it is possible to provide a system that extracts the feature point of the workpiece and operate a robot in a teachless manner.

A program according to the present disclosure causes an information processing apparatus to execute:
  inputting CAD data of an object and a workpiece and a feature point of the workpiece;
  generating a plurality of composite images from the CAD data of the object and the workpiece with various angles and arrangements of the object and the workpiece, various distances to the object and the workpiece, various exposure conditions, and various backgrounds.

With the above configuration, a program that can generate a plurality of composite images of an object, a workpiece, and a feature point from the CAD data can be provided.

According to the present disclosure, it is possible to improve accuracy of a learning model by having an information processing apparatus generate and learn a plurality of composite images of an object, a workpiece, and a feature point from CAD (Computer-Aided Design) data. Therefore, it is possible to provide a system that extracts the feature point of the workpiece and operate a robot in a teachless manner.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiment

An embodiment of the present disclosure will be described below with reference to the drawings. However, the disclosure set forth in the claims is not limited to the following embodiment. Also, not all of the configurations described according to the embodiment are essential as means to solve the problem. For clarity of explanation, the following descriptions and drawings have been omitted and simplified as appropriate. In each drawing, the same elements are marked with the same signs, and repeated descriptions have been omitted as necessary.

Description of Robot According to the Embodiment

Figure 1:
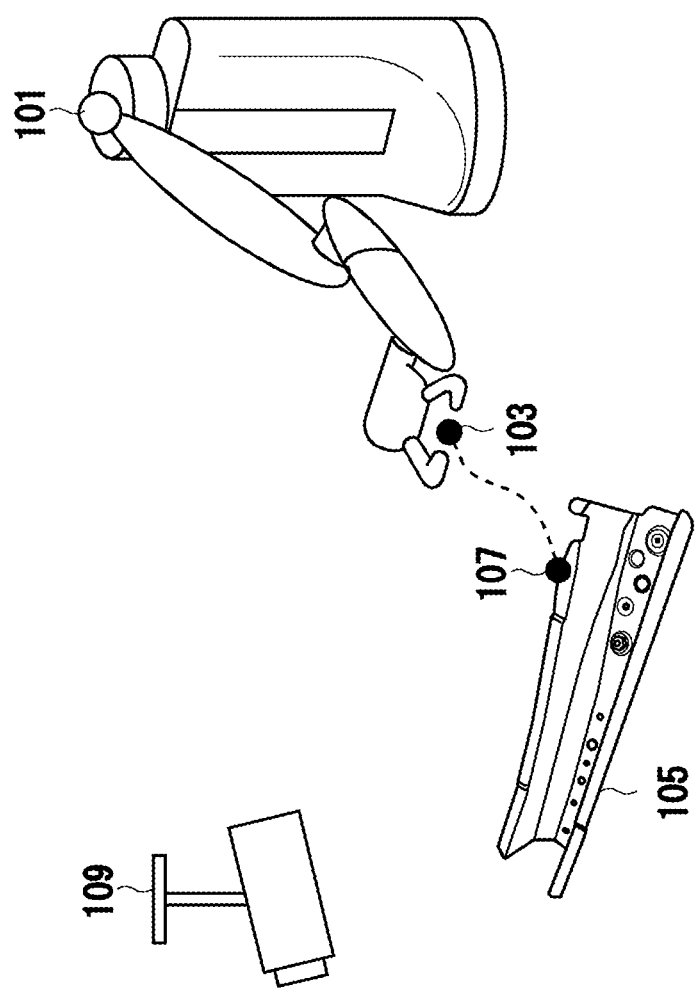
FIG. 1 is a schematic diagram of a robot according to an embodiment.

FIG. 1 is a schematic diagram of a robot according to an embodiment. The robot according to the embodiment will be described with reference to FIG. 1.

A robot 101 includes an arm. End effectors 103 are provided at a leading end of the arm. The end effectors 103 can grasp or weld a workpiece 105. That is, the robot 101 is a robot for welding or transportation.

The robot 101 grasps or welds the feature point 107 of the workpiece 105. That is, the feature point 107 is a welding point or a grasping point. The robot 101 grasps the feature point 107 to transport the workpiece 105 or welds the workpiece 105 at the feature point 107. A plurality of the feature points 107 may be provided for one workpiece 105. For example, when one workpiece 105 has a plurality of welding points, the plurality of welding points become feature points.

The imaging apparatus 109 photographs the workpiece 105 and the robot 101. Specifically, the imaging apparatus 109 photographs the workpiece 105 and the information processing apparatus 215 recognizes the feature point 107. The information processing apparatus 215 also recognizes the positions of the end effectors 103 of the robot 101. The imaging apparatus 109 is used to move the end effectors 103 of the robot 101 to the feature point 107 of the workpiece 105. That is, the imaging apparatus 109 is used to search for a route as indicated by the dotted line between the end effectors 103 and the feature point 107.

When the imaging apparatus 109 is attached to a predetermined position of the robot 101, the route can be searched for only by photographing the workpiece 105. This is because the information processing apparatus 215 knows the position of the end effectors 103 of the robot 101.

Description of Robot Operation System According to Embodiment

Figure 2:
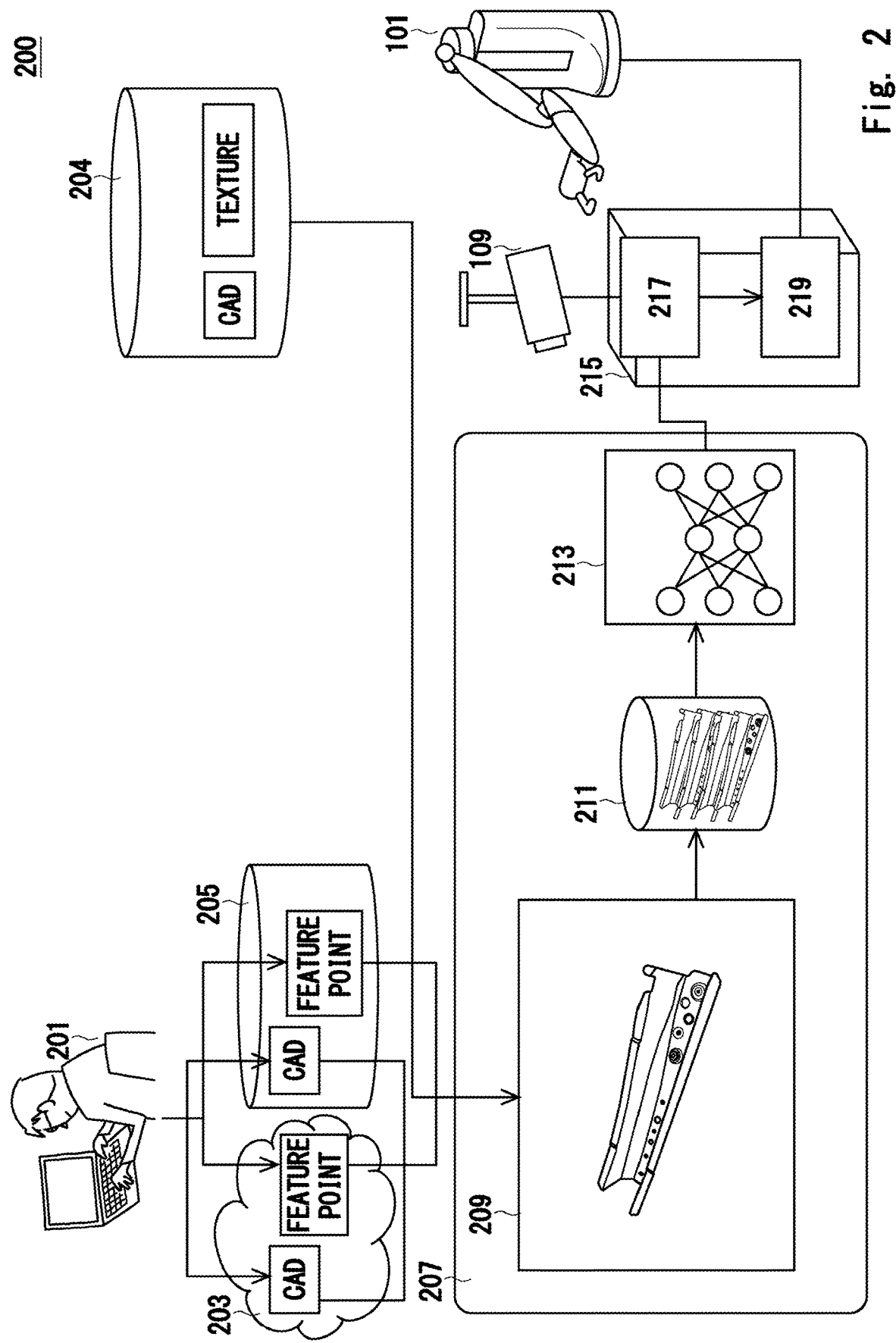
FIG. 2 is a block diagram of a robot operation system according to the embodiment.
Figure 3:
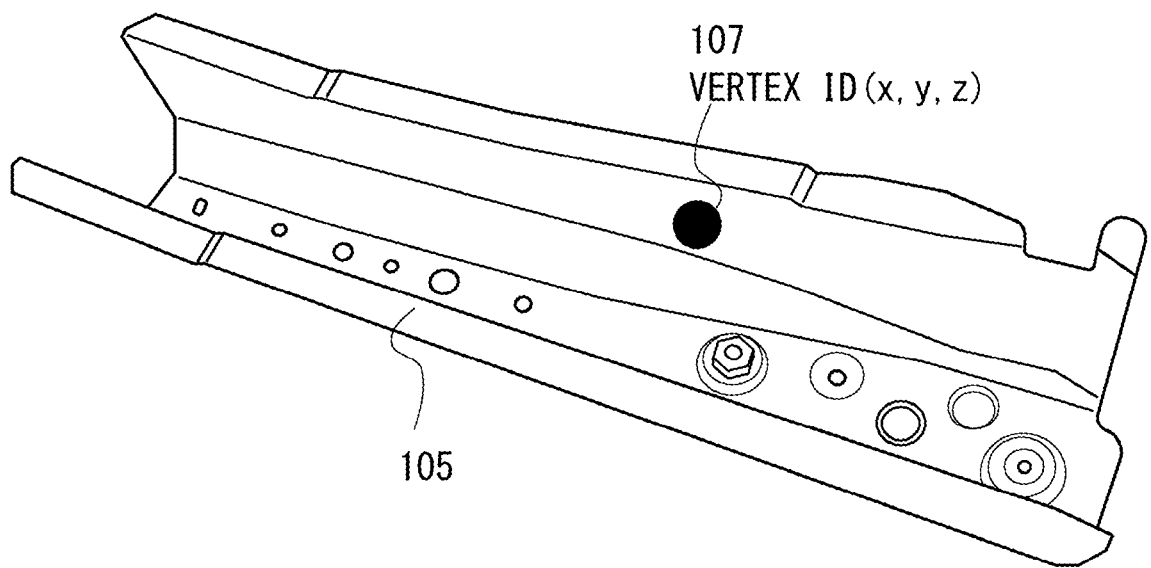
FIG. 3 is a schematic diagram of a workpiece according to the embodiment.

FIG. 2 is a block diagram of a robot operation system according to the embodiment. FIG. 3 is a schematic diagram of the workpiece according to the embodiment. The robot operation system according to the embodiment will be described with reference to FIGS. 2 and 3.

The robot operation system 200 according to the embodiment includes a cloud 203, a server 205, or a WEB server 204. The robot operation system 200 also includes an information processing apparatus 207, an information processing apparatus 215, a robot 101, and an imaging apparatus 109.

The cloud 203 or the server 205 stores CAD data of the workpiece 105 and the feature point 107 of the workpiece 105 designed by a designer 201. If data can be stored, a PC storage may be used instead of the cloud 203 or the server 205. Whenever the designer 201 changes the design of the workpiece 105, data is stored in the cloud 203 or the server 205.

The WEB server 204 stores the CAD data and texture of an object. The object is an object such as a desk, chair, and jig in a factory on which the workpiece 105 disposed. The information processing apparatus 207 is connected to the WEB server 204 to widely collect the CAD data of the object, and may instead be connected to the closed server 205 or the cloud 203.

The information processing apparatus 207 includes a composite image generation unit 209, a composite image storage unit 211, and a machine learner 213.

The composite image generation unit 209 photographs the workpiece 105 and the object under random conditions and projects the feature point 107 to obtain a composite image. For example, when the object is a desk, the composite image generation unit 209 generates a composite image of the workpiece 105 in a state in which it is placed on the desk. The random conditions are conditions in which the texture, lighting, angle of view of the imaging apparatus, filter, aspect ratio, size, and background are changed. Changing the texture means that the color and texture of the object and the workpiece are changed. Changing the lighting conditions means that the position, angle, color, and intensity of the lighting are changed. Changing the angle of view of the imaging apparatus means that the position and orientation of the imaging apparatus are changed. Changing the filter means that blur, noise, smog, and halation are added to the image. Such conditions are referred to as angles and arrangements of various objects and workpieces, distances to various objects, various exposure conditions, and various backgrounds.

The composite image storage unit 211 stores a plurality of composite images generated by the composite image generation unit 209. Millions of composite images are needed for use in machine learning. It usually takes months to acquire images for learning. However, by having the composite image generation unit 209 create these composite images, materials can be collected in a few days.

The machine learner 213 learns from a plurality of input training datasets. Each training dataset is composed of a combination of the composite image and the position of the feature point 107. The machine learner 213 learns the feature point 107 of the workpiece 105 by supervised learning. Supervised learning is a method in which, when a ground truth is predetermined in the data to be learned, a large number of training datasets each composed of the combination of the data to be learned (input) and the ground truth (output) is given in advance to learn the relationship between input and output. Since the composite images generated from the CAD data is used, the coordinates of the feature points can be accurately obtained.

The training datasets are given to an untrained machine learner. The training dataset is constructed by combining the composite image of the workpiece 105 as an input and the feature point 107 as an output (ground truth label). For example, the composite image of the workpiece 105 is text data indicating three-dimensional coordinates. For example, the data of the feature point (vertex ID) is text data indicating three-dimensional coordinates.

The trained machine learner 213 is created by inputting a plurality of composite images of the workpiece to the machine learner that uses a neural network for learning. The trained machine learner 213 outputs the feature point 107 when an image of the workpiece 105 is input. The machine learner generates the trained machine learner 213 with a multi-layered neural network, for example, by deep learning. The trained machine learner may be a CNN (Convolutional Neural Network) model with a convolutional or pooling layer.

The information processing apparatus 215 includes a memory unit 217 and an arithmetic unit 219. The information processing apparatus 215 is connected to the robot 101 and the imaging apparatus 109.

The memory unit 217 stores the trained machine learner 213. The arithmetic unit 219 is connected to the memory unit 217 and the imaging apparatus 109. The arithmetic unit 219 outputs the position of the feature point 107 of the workpiece 105 in response to an input of the photographed image of the workpiece to the trained machine learner 213 read from the memory unit 217.

The imaging apparatus 109 photographs the robot 101 and the workpiece 105 or the workpiece 105. The imaging apparatus 109 may photograph the workpiece 105 disposed on an object such as a desk. That is, the imaging apparatus 109 may photograph the workpiece with the object. Therefore, the photographed image includes the workpiece and the object. The information processing apparatus 215 searches for a route between the position of the end effectors 103 and the position of the feature point 107 using the image photographed by the imaging apparatus 109. The information processing apparatus 215 moves the end effectors 103 to the feature point 107 along the searched route.

Such a robot operation system 200 can improve the accuracy of the learning model by generating and learning a plurality of composite images from the CAD data. Here, the composite image includes the object and the workpiece 105. The coordinate data of the feature point 107 is attached to the composite image. Also, normally, the route could not have been searched for without providing the position of the feature point 107 of the workpiece 105 and those of the end effectors 103. However, the robot operation system according to the embodiment can provide a system for operating the robot in a teachless manner, because it can automatically detect the positions of the feature point 107 of the workpiece and those of the end effectors 103 and search the route.

Furthermore, the composite image generation unit 209 generates the composite image including the workpiece 105 and the object. The composite image generation unit 209 generates a plurality of the composite images under various conditions. In each training dataset, data of the feature point 107 is associated with the composite image. The machine learner 213 is obtained by machine learning using a plurality of the training datasets. Therefore, the feature point can be extracted with high accuracy from a photographed image of the workpiece 105 disposed on the object.

Description of Robot Operation Method According to Embodiment

Figure 4:
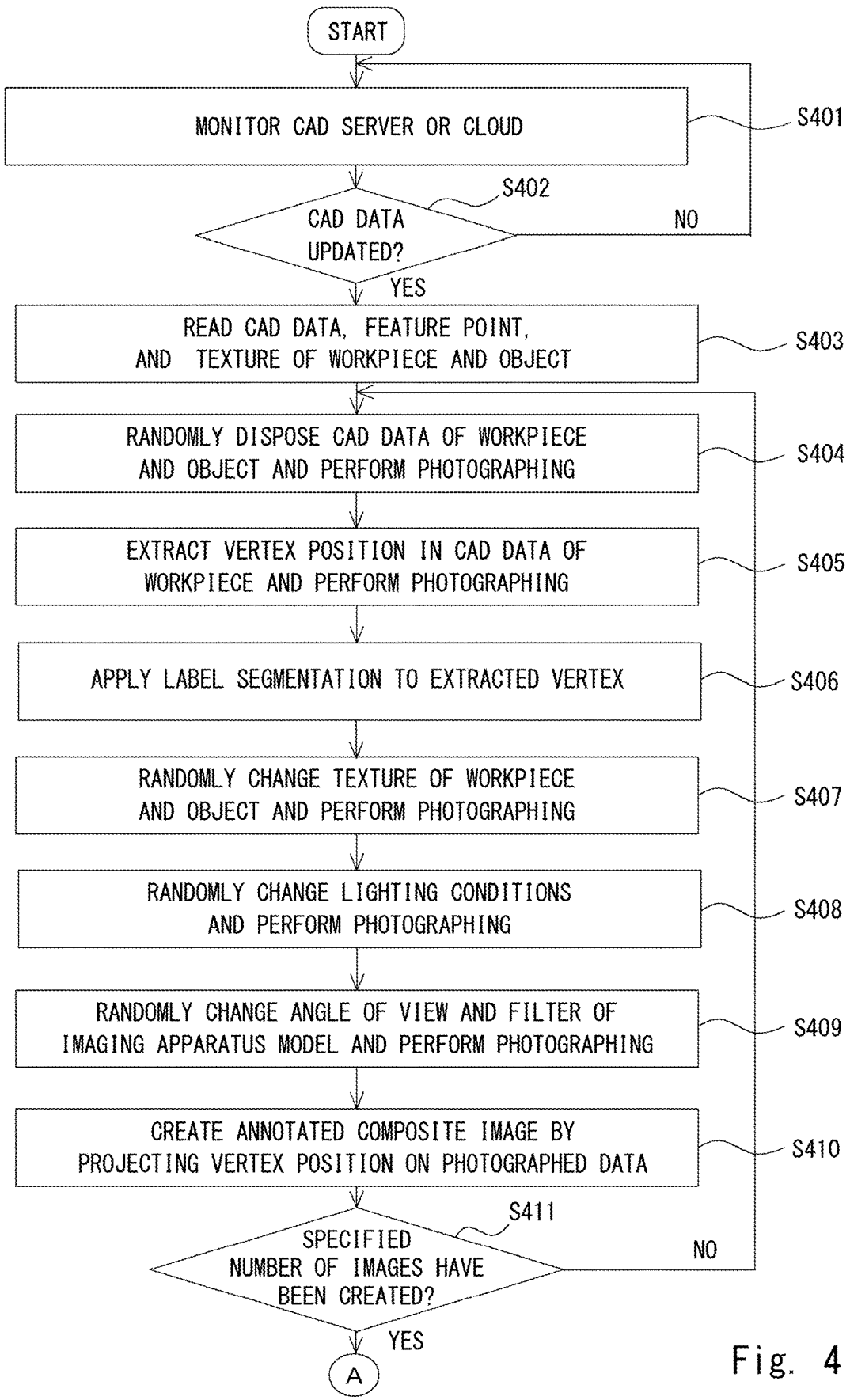
FIG. 4 is a flowchart of a robot operation method according to the embodiment.
Figure 5:
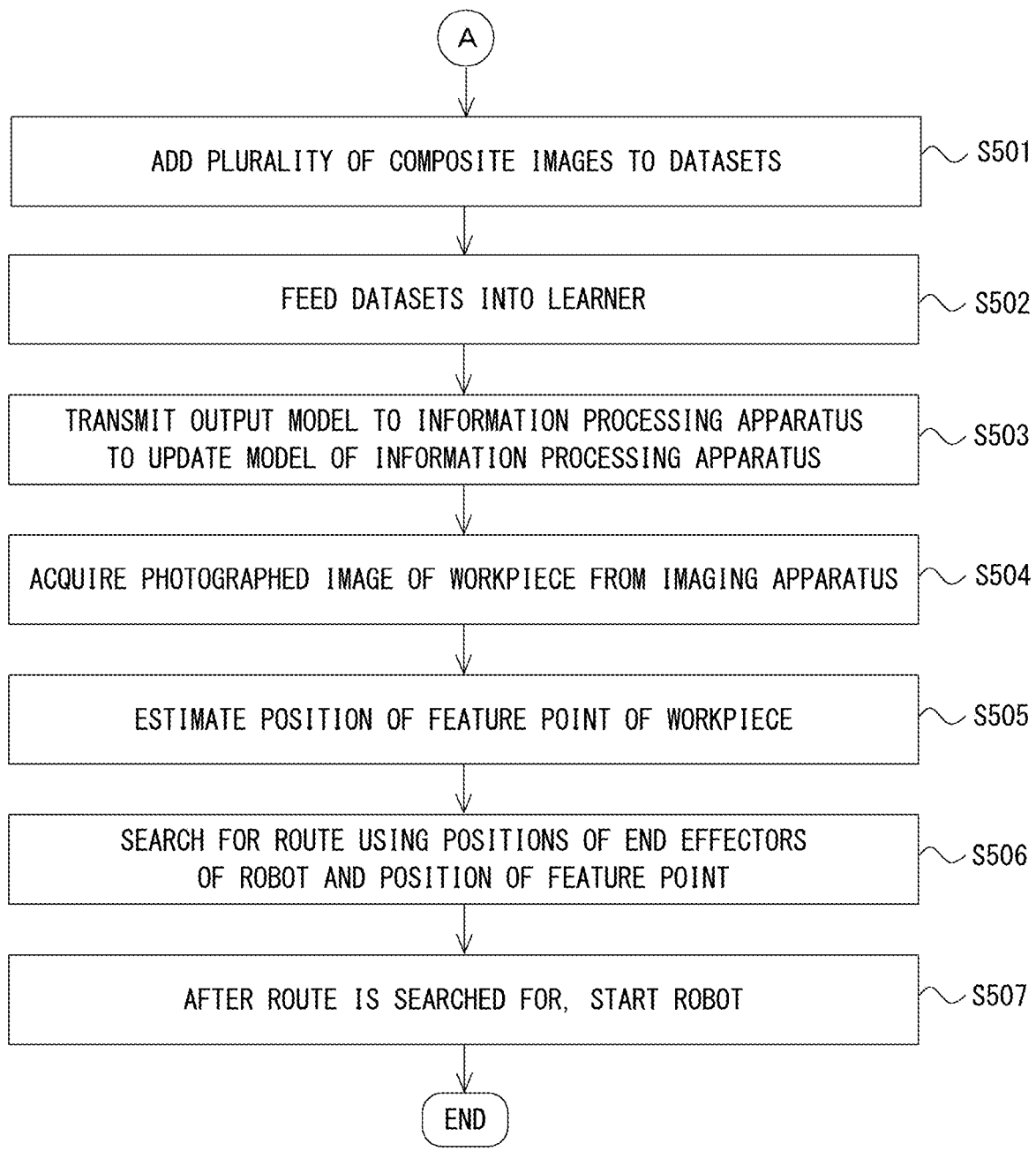
FIG. 5 is a flowchart of the robot operation method according to the embodiment.

FIG. 4 is a flowchart of the robot operation method according to the embodiment. FIG. 5 is a flowchart of the robot operation method according to the embodiment. The robot operation method according to the embodiment is described with reference to FIGS. 4 and 5.

First, the information processing apparatus 207 monitors the CAD server or the cloud (Step S401). Next, the information processing apparatus 207 determines whether or not there is an update of the CAD data (Step S402). To determine whether or not the designer 201 has updated the CAD data, the CAD server or the cloud is monitored. If the CAD data is not updated (NO in Step S402), the information processing apparatus 207 again monitors the CAD server or the cloud (Step S401). If the CAD data is updated (YES in Step S402), the CAD data, the feature point 107, and the texture of the workpiece 105 and the object are read (Step S403). The information processing apparatus 207 reads the updated CAD data of the workpiece 105 and the object, and the feature point 107 of the workpiece 105 and the texture of the object.

Next, the CAD data of the workpiece and the object are randomly disposed (Step S404). The workpiece 105 and the object are randomly disposed and then photographing is performed in a CAD space of the composite image generation unit 209 of the information processing apparatus 207. Next, a vertex position in the CAD data of the workpiece is extracted using a vertex ID in a feature point list (Step S405). The composite image generation unit 209 finds a vertex of the workpiece 105 that matches the vertex ID of the feature point list. Next, label segmentation is applied to the extracted vertex (Step S406). The composite image generation unit 209 applies the label segmentation indicating that the vertex is important to the workpiece 105. Next, the texture of the workpiece and the object is randomly changed and then photographing is performed (Step S407). Next, the lighting conditions are randomly changed and then photographing is performed (Step S408). Next, the angle of view and the filter of the imaging apparatus model are randomly changed and then photographing is performed (Step S409). An annotated composite image is created by projecting the vertex position on the photographed data (Step S410). The composite image generation unit 209 adds the feature point to these pieces of photographed data to create a composite image.

Next, it is determined whether or not the specified number of images have been created (Step S411). If the specified number of images have not been created (NO in Step S411), the processing returns to Step S404 to photograph the workpiece 105 and the object. If the specified number of images have been created (YES in Step S411), the processing continues to Step S501 in FIG. 5.

If the specified number of images have been created (YES in Step S411), a plurality of composite images are added to the datasets (Step S501). The information processing apparatus 207 adds the composite images to the training datasets. Next, the datasets are fed into the learner (Step S502). The information processing apparatus 207 adds the datasets to the machine learner 213 to learn them. An output model is then transmitted to the information processing apparatus to update a model of the information processing apparatus (Step S503). The information processing apparatus 207 transmits the model to the information processing apparatus 215 to update the model stored in the memory unit 217.

Next, an image of the workpiece is acquired from the imaging apparatus (Step S504). The imaging apparatus 109 photographs an image of the workpiece 105. Next, the feature point of the workpiece is estimated (Step S505). The arithmetic unit 219 of the information processing apparatus 215 estimates the feature point 107 of the photographed image of the workpiece 105 from a result of the learning. Next, a route is searched for using the positions of the end effectors of the robot and the position of the feature point (Step S506). The information processing apparatus 215 searches for the route using the positions of the end effectors 103 of the robot 101 and the position of the feature point 107. Finally, after the route is searched for, the robot is started (Step S507) and then the search for the route is terminated. After the route is searched for, the information processing apparatus 215 moves the robot 101 and moves the end effectors 103 to the feature point 107.

By generating a plurality of composite images of an object, a workpiece, and a feature point from CAD data and learning the composite images, the accuracy of the learning model can be improved. Therefore, it is possible to provide a method of extracting a feature point of a workpiece and operating a robot in a teachless manner.

In addition, part or all of the processing in the information processing apparatus 207, the composite image generation unit 209, and the information processing apparatus 215 described above can be implemented as computer programs. Such a program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

By executing the above program of the composite image generation unit 209, a composite image of a plurality of objects, workpieces, and feature points can be generated from the CAD data.

The present disclosure is not limited to the above embodiment and may be changed as appropriate without departing from the scope. For example, although the information processing apparatus 207 and the information processing apparatus 215 are different apparatuses, they may be one device. Some of the functions of the information processing apparatus 207 may be disposed in the cloud.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot operation system comprising:
a composite image generation unit to which Computer-Aided Design (CAD) data of an object and a workpiece and a feature point of the workpiece are input, the composite image generation unit being configured to generate a plurality of composite images under random conditions from the CAD data of the object and the workpiece;
an information processing apparatus configured to search for a route using a position of an end effector of a robot and a position of the feature point and move the end effector to the feature point along the searched route; and
an imaging apparatus configured to photograph the end effector of the robot, the object and the workpiece, wherein
the information processing apparatus comprises a memory unit configured to store a trained machine learner trained using a plurality of input training datasets, each of the training datasets being composed of a combination of each composite image and the position of the feature point,
the information processing apparatus is configured to output the position of the feature point in response to an input of a photographed image of the workpiece to the trained machine learner read from the memory unit, and
the information processing apparatus uses an image of the end effector and the feature point photographed by the imaging apparatus to search for the route.

2. The robot operation system according to claim 1, wherein the random conditions are various angles and arrangements of the object and the workpiece, various distances to the object and the workpiece, various exposure conditions, and various backgrounds.

3. The robot operation system according to claim 1, wherein the plurality of composite images generated have varying sizes and aspect ratios.

4. The robot operation system according to claim 1, wherein the feature point is a grasping point or a welding point.

5. A robot operation method comprising:
inputting Computer-Aided Design (CAD) data of an object and a workpiece and a feature point of the workpiece;
generating a plurality of composite images under random conditions from the CAD data of the object and the workpiece;
creating a trained machine learner trained using a plurality of input training datasets, each of the training datasets being composed of a combination of each composite image and a position of the feature point;
photographing an end effector of a robot, the object and the workpiece;
outputting the position of the feature point in response to an input of a photographed image of the workpiece to the trained machine learner; and searching for a route using a position of the end effector of the robot and the position of the feature point and moving the end effector to the feature point along the searched route, wherein the searching for the route uses an image of the end effector of the robot and the feature point photographed.

6. A non-transitory computer readable medium storing a program for causing an information processing apparatus to execute:

inputting Computer-Aided Design (CAD) data of an object and a workpiece and a feature point of the workpiece;

generating a plurality of composite images from the CAD data of the object and the workpiece with various angles and arrangements of the object and the workpiece, various distances to the object and the workpiece, various exposure conditions, and various backgrounds;

creating a trained machine learner trained using a plurality of input training datasets, each of the training datasets being composed of a combination of each composite image and a position of the feature point;

photographing an end effector of a robot, the object and the workpiece;

outputting the position of the feature point in response to an input of a photographed image of the workpiece to the trained machine learner; and searching for a route using a position of the end effector of the robot and the position of the feature point and moving the end effector to the feature point along the searched route, wherein the searching for the route uses an image of the end effector of the robot and the feature point photographed.

* * * * *